Dec. 11, 1951 J. W. STILES 2,577,926
ADJUSTABLE CONVEYER DEVICE
Filed July 6, 1949 3 Sheets-Sheet 1
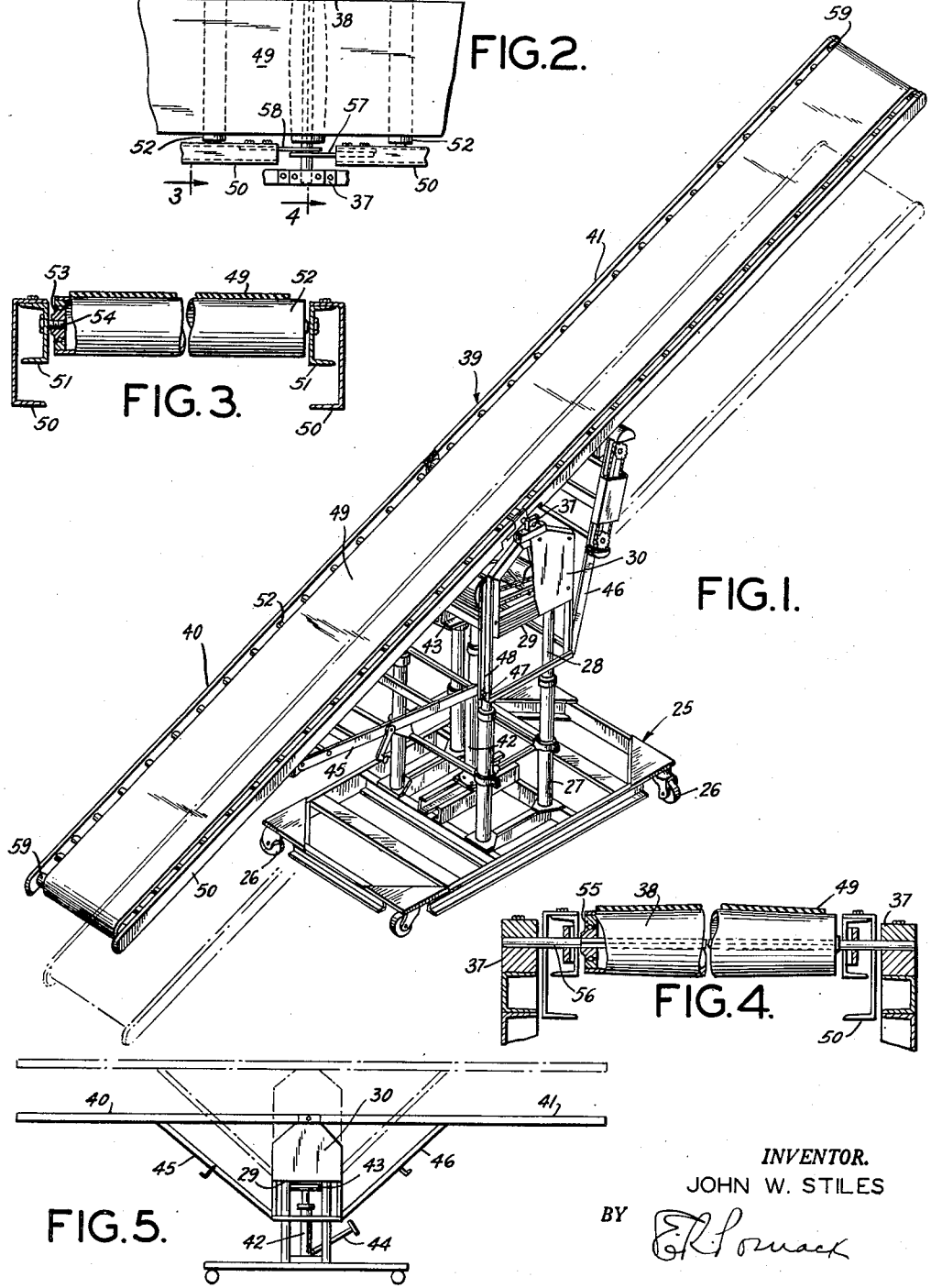
INVENTOR.
JOHN W. STILES
BY
ATTORNEY.

Dec. 11, 1951 J. W. STILES 2,577,926
ADJUSTABLE CONVEYER DEVICE
Filed July 6, 1949 3 Sheets-Sheet 2
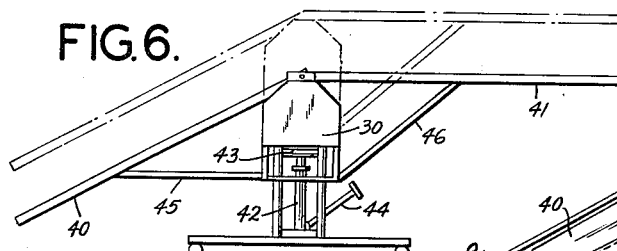
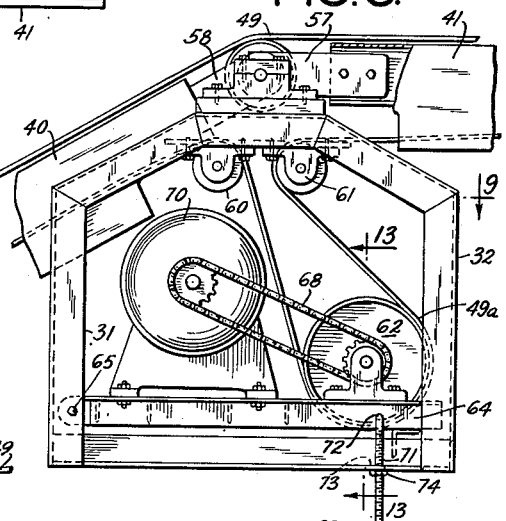
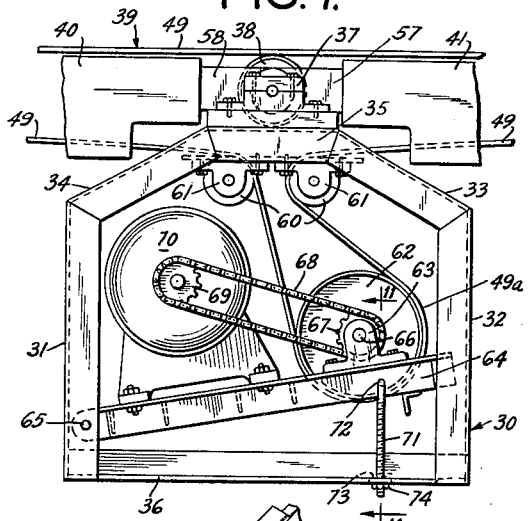
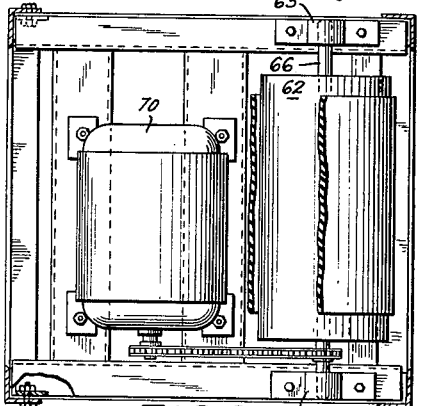
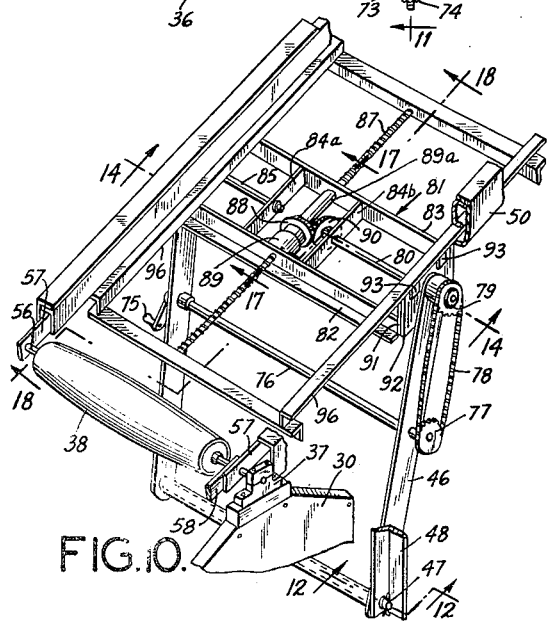
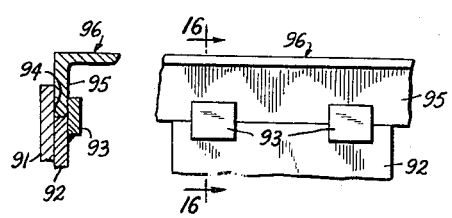
INVENTOR.
JOHN W. STILES
BY
ATTORNEY.

Dec. 11, 1951 J. W. STILES 2,577,926
ADJUSTABLE CONVEYER DEVICE
Filed July 6, 1949 3 Sheets-Sheet 3
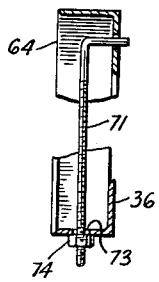
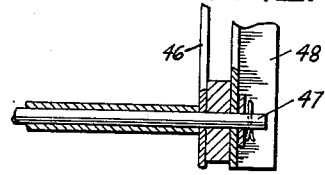
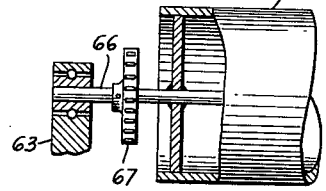
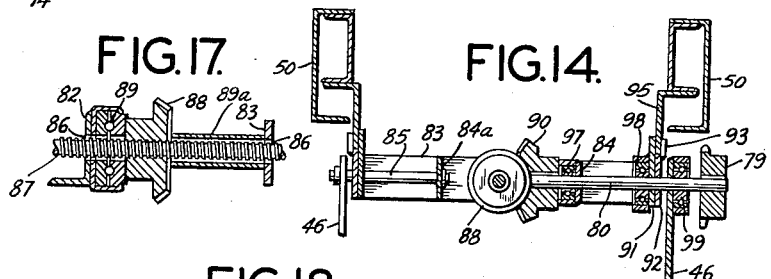
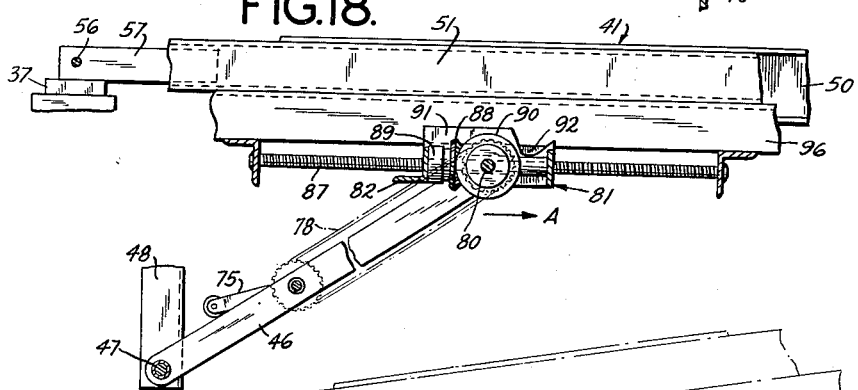
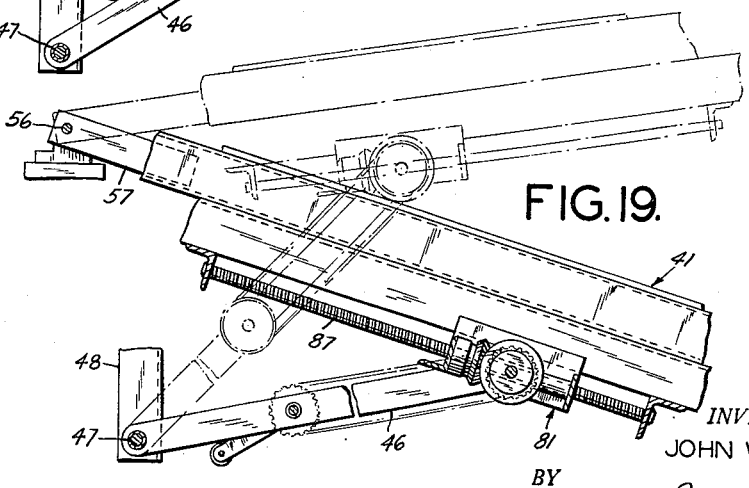
INVENTOR.
JOHN W. STILES
BY
ATTORNEY.

Patented Dec. 11, 1951

2,577,926

UNITED STATES PATENT OFFICE 2,577,926

ADJUSTABLE CONVEYER DEVICE

John W. Stiles, New York, N. Y.

Application July 6, 1949, Serial No. 103,234

16 Claims. (Cl. 198—109)

This invention relates to adjustable belt conveyor units, more particularly to movable conveyor devices frequently known as "boosters" for use between loading and discharge points of different levels.

Conventional conveyor units of this category generally contain a continuously operating belt mounted on a rigid frame which can be raised or lowered, or tilted so that the entire conveyor belt is disposed at the desired angle for the particular job at hand. With devices of this type it is frequently difficult to fit the unit in limited spaces between loading and discharge points, since the length of the belt is fixed and the entire framework is rigid and cannot be bent. It is also necessary with certain conventional conveyors of this category that, because of their lack of flexibility, considerable moving, turning and manual manipulation of the entire unit must be resorted to in order to bring it into proper operative position with respect to different loading and discharge levels. It is primarily to overcome these disadvantages and shortcomings that I have provided the adjustable conveyor unit of this invention.

An important object of my invention is to present an adjustable movable conveyor device wherein the loading and discharge portions may be selectively moved into different relative positions. And in this aspect of my invention it is an object to provide a unit which is operatively reversible without turning the unit, which may be raised and lowered at will, which is easily movable, and which may be bent midway along its length, by a simple manual manipulation, to independently change the loading and discharge points. It is within my contemplation to provide a variably adjustable structure, more specifically, one in which there may be a straight horizontal positioning of the conveyor belt bed, straight inclined positions of the bed in opposite directions, bent arrangements of the belt with opposite portions of the bed at different angles, or with one portion inclined and the other horizontal.

It is a further object of my invention to provide an adjustably bendable conveyor structure of the type above-described wherein a single continuous conveyor belt is employed. And it is within my contemplation to accomplish this objective by employing a novel automatic take-up to compensate for belt length changes between different bent positions of the unit. And it is my object to effect such a length compensation without the conventional expedient of employing two separate belt elements connected by an intermediate belt for take-up purposes.

Still a further object of my invention is to enable the employment of certain transmission mechanisms as a counterweight to provide operable belt tensions for different positions of the bendable conveyor framework above-mentioned.

And it is within my contemplation to enable the above objectives to be accomplished by a relatively simple and easily operated mechanism.

Other objects, features and advantages will appear from the drawings and the description hereinafter given.

Referring to the drawings,

Figure 1 is a perspective view of a preferred form of a conveyor unit according to my invention, showing with the entire length of conveyor belt bed in a straight inclined position, a fragment being broken away for clarity, the dot-dash lines indicating a lowered position of the bed.

Figure 2 is a fragmentary plan view of the medial portion of the conveyor belt bed, with a portion broken away for clarity.

Figure 3 is an enlarged transverse section of Figure 2 taken along the line 3—3 thereof.

Figure 4 is an enlarged transverse section of the middle of the belt bed of Figure 2, taken substantially along line 4—4 thereof.

Figure 5 is a schematic side elevation of the device of Figure 1, showing the belt bed in a straight horizontal position, the dot-dash lines indicating an elevated position of the bed.

Figure 6 is a schematic view like Figure 5, but showing the bed bent, the left bed section being inclined and the right section being horizontal.

Figure 7 is a somewhat enlarged side elevation of the transmission supporting frame, showing also fragments of the two opposing belt bed sections in horizontal positions.

Figure 8 is a view like Figure 7, but showing the left bed section in an inclined position, and illustrating the lowered position of the transmission supporting platform.

Figure 9 is a fragmentary sectional plan view of Figure 8 taken substantially along 9—9.

Figure 10 is a fragmentary perspective of one section of the belt bed and adjusting mechanism associated therewith, the belt being removed.

Figure 11 is a section of Figure 7 taken substantially along line 11—11.

Figure 12 is a section of Figure 10 taken substantially along line 12—12.

Figure 13 is a fragmentary section, partly in elevation, taken along line 13—13 of Figure 8.

Figure 14 is a transverse section taken substantially along line 14—14 of Figure 10.

Figure 15 is a fragmentary side elevation of Figure 14.

Figure 16 is a fragmentary section of Figure 15 taken along line 16—16.

Figure 17 is a fragmentary section of Figure 10 taken substantially along line 17—17.

Figure 18 is a longitudinal section of Figure 10 taken substantially along line 18—18 thereof showing the position of the adjusting and control mechanism for a bed section when in its horizontal position, and Figure 19 is a view substantially like Figure 18, but showing in full and dot-dash lines several adjusted positions of the parts of Figure 18.

In the form of my invention illustrated in the drawings, the unit contains a portable base member 25 supported upon casters 26, said base operatively supporting four tubular stanchions 27 with slidable telescopically inserted posts 28 in underlying supporting engagement with the base 29 of the transmission-supporting housing 30. The periphery of said housing consists of structural members, the particular embodiment illustrated containing (Figure 7) oppositely disposed frames each made up of angles 31, 32, 33, 34, 35 and 36, although it is understood that other structural members may be employed with like effect within the contemplation of this invention. Upper members 35 each operatively support the split pillow blocks 37 which rotatably support therebetween the hump pulley 38 disposed transversely across the middle of the belt bed 39, thereby separating said bed into opposite portions 40 and 41, all as will hereinafter more clearly appear. The said base 25 also supports, centrally with respect to the stanchions 27, the hydraulic jack 42, the upper plunger of which is in underlying engagement with the structural member 43 extending along the said floor 29 of housing 30. The construction of said jack will not herein be described, since it is well known to those skilled in the art, such description being unnecessary for the understanding of the present invention. It is, however, understood that any lifting jack supported between the base 25 and housing 30 may be employed within the scope and intent of the invention. In the form illustrated, the said jack is operated by a suitable handle 44, whereby it may be raised and lowered in known manner to correspondingly raise and lower the housing 30 and the bed 39.

Sections 40 and 41 of the bed 39 are each operatively supported by booms 45 and 46, these being pivotally mounted at points 47 in the vertical structural members 48 (see Figures 10, 18 and 19). A specific description of the said structural supports 48 will not herein be given, since that is not necessary for the understanding of the present invention, other than to say that said members 48 are preferably rigid and immovable, whereby fixed pivotal anchors are provided for the said booms 45 and 46. As will more clearly hereinafter appear, these booms, through manual manipulation, are adapted to support sections 40 and 41 of the bed 39 in selected operative positions. For example, Figure 1 shows said booms so disposed with respect to belt bed 39 as to maintain the sections 40 and 41 thereof in longitudinal straight-line alignment, and at an inclination. Figure 5 shows sections 40 and 41 horizontally disposed, and in straight-line alignment. Figure 6 shows the booms so disposed as to maintain section 40 in an inclined position, and section 41 in a horizontal position. It is also obvious that by suitable manipulation of the jack 42, the entire bed 39 can be raised or lowered, as illustrated in said Figures 1, 5 and 6. The arrangement is hence such that both sections of the bed can be independently controlled so that they can be adjusted to various loading and discharge points, within the dimensional limitations of the structure. It is thus evident that the entire bed may be maintained in straight-line position, or may be bent. This is effected, in a manner which will hereinafter be explained, with the employment of but a single continuous conveyor belt 49, the tension therein being automatically maintained regardless of the relative positions of the two sections 40 and 41 of the bed.

Sections 40 and 41 of bed 39 each contains two parallel oppositely disposed lateral channels 50 (see Figures 1 to 4), to which are secured the roller-supporting channels 51. In the particular construction illustrated, the rollers 52 have their ends provided with ball bearing races 53 and studs 54 supported by the channels 51. The said hump pulley 38 is in effect another roller, but located at the middle of the bed, as aforesaid, this also being provided with ball bearing races 55 and a shaft 56 rotatably supported by the said split pillow blocks 37. Said shaft 56 extends through the coacting apertured hinge plates 57 and 58 secured to the adjacent channels 50 of sections 40 and 41 of the bed 39. As will be seen particularly in Figures 2, 8 and 10, said hinge plates are overlapping and contain holes in registry through which the said shaft 56 extends. The arrangement is hence such that the hump pulley 38 is fixedly maintained in its position relative to housing 30 regardless of the relative positions of sections 40 and 41 of bed 39.

The upper portion of the belt 49 extends between the lateral sides of sections 40 and 41, and is in rolling engagement with the rollers 52 supported by channels 50 and 51, as aforesaid. The lower portion of the belt extends from the end rollers 59 inwardly towards the snub rollers 60 rotatively supported by the bearings 61, the belt extending over said snub rollers and downwardly and around the lower portion of drive roller 62. The latter is rotatably supported by bearings 63 resting upon the pivotally mounted platform 64, the pivotal mounting being at points 65 in members 31. Affixed to shaft 66 of roller 62 is the sprocket wheel 67 which is connected by sprocket chain 68 to sprocket wheel 69 on the shaft of motor 70 which is also mounted on said pivotal platform 64. Extending downwardly from oppositely disposed portions of the platform 64 are preferably two (only one being shown) stop bolts 71, these bolts each being pivotally mounted at 72 and extending through a slotted aperture 73 in the floor 36 of housing 30. The portion of stop bolt 71 below member 36 is provided with a nut 74 threaded thereon (Figures 7, 8 and 11). The said slot 73 is proportioned to permit a free movement of bolt 71 therein in the direction of the length of platform 64, so that each slot 73 will accommodate its bolt 71 at different pivotal positions of platform 64. For example, in Figure 7 where the platform 64 is raised to an inclined position, the bolt is shown centrally disposed with respect to slot 73; whereas in Figure 8, where the platform is in a lowered horizontal position, the bolt is shown disposed in the right portion of said slot 73. It will be observed that in both cases the nut had been adjustably moved so that it is in underlying engagement with member 36, the arrangement being such that for each position of platform 64, the nut 74 is set so as to prevent an upward displacement of said platform. It will be obvious, as the description proceeds, that there is no need to provide any stop with respect to a downward displacement thereof.

For any given relative position of sections 40 and 41, the platform 64 will adjust itself to a corresponding position because of the weight of the motor 70, roller 62 and associated parts, the weight of these components of the transmission mechanism being effective in gravitationally urging the platform 64 downwardly against the action of the belt 49. In other words, the loop 49a of the belt which engages the roller 62 serves to support the platform 64 and the weight carried thereby, said belt being always kept in tension by the gravitational action aforesaid. When one or both of the sections 40 and 41 are moved from one relative position to another, the loop 49a will be correspondingly raised or lowered, but at all times will be maintained in operative tension. For example, in Figure 7, the two sections 40 and 41 are in horizontal alignment, and the platform 64 is in a raised inclined position. When section 40 is lowered to the inclined position shown in Figure 8, the loop portion 49a will be correspondingly lowered, whereupon the platform 64 will also be lowered to the position indicated, and will remain there until the position of sections 40 or 41 is changed.

It is thus apparent that with the arrangement above-described, the transmission mechanism which drives the belt automatically maintains an operative tension in the belt, regardless of the relative positions of sections 40 and 41 of the bed. The combination of the pivotally mounted platform, the transmission means supported thereby and the loop 49a of the belt accordingly serves as an automatic take-up, thereby obviating the need of employing special compensating mechanisms or a plurality of belts for accomplishing this purpose.

The manner in which the booms 45 and 46 are operated to vary the relative positions of sections 40 and 41 will now be described (Figures 10 to 19). Each pair of booms is provided with a crank member 75 associated with a shaft 76 rotatably supported by the boom such as 46. One terminal of the shaft is provided with a sprocket wheel 77 connected by chain 78 to an upper sprocket wheel 79 keyed to transverse shaft 80 which extends through a plurality of holes (to be hereinafter described) forming part of the movable carriage 81. This carriage contains oppositely disposed transverse members 82 and 83 between which are disposed the two parallel longitudinal bars 84a and 84b. Bar 84a rotatably supports the shaft 85 upon which is pivotally mounted one of the booms 46 (Figure 14); and bar 84b rotatably supports the said shaft 80. Extending through opposite holes in members 82 and 83 (holes 86, shown in Figure 17) is the threaded carrier rod 87, the threads thereon being of square or Acme type. Mounted over said rod 87 and in threaded engagement therewith is the bevel gear 88, the bore of which is threaded so that upon an operative rotation of gear 88 it will move longitudinally relative to the rod. The said gear is in abutting engagement with the thrust bearing 89 (Figure 17) disposed against the member 82; and disposed between gear 88 and member 83 is the tubular spacer 89a. The inner end of shaft 80 has affixed thereto the bevel gear 90, this being in operative engagement with gear 88.

The lateral sides of carriage 81 consist of three thicknesses of walls secured together to form a unit. More specifically (Figures 14, 15 and 16), each of said sides consists of two adjacent plates 91 and 92, and two longitudinally spaced plate sections 93. These plates and sections are so arranged as to form a recess 94 into which extends the vertical leg 95 of the angle 96, said angle constituting part of the stationary framework of the unit. Hence, elements 91, 92 and 93 (which are part of the carriage 81) are slidably movable longitudinally along the leg 95 of angle 96. In a manner to now be described, the operative rotation of crank 75 causes an operative slidable movement of carriage 81 relative to the stationary framework of the apparatus.

The rotary movement of crank 75 causes shaft 80 and bevel gear 90 to rotate by virtue of the sprocket and chain connection 77 and 78. This will cause a corresponding rotation of bevel gear 88. Such rotation must cause a longitudinal movement of gear 88 on rod 87; and since there can be no relative movement longitudinally of gear 88 relative to carriage 81 (because of the spacer 89a), such movement is transmitted to the entire carriage 81. The legs 95 of angles 96 serve as guiding tracks for the longitudinal movement of carriage 81 and the ball bearing races 97, 98 and 99 facilitate the rotary movement. In the construction illustrated, the race 97 is affixed to bar 84b the race 98 is affixed to wall 91, and the race 99 is attached to boom 46.

By referring to Figures 18 and 19 it will become evident that as this carriage operatively moves in the direction of the arrow A, the weight of the section 41 will cause it to pivotally move down about 56 as an axis, because of the cantilever construction. Thus the section 41 can be tilted downwardly from the position shown in Figure 18 to the full line position of Figure 19. And it can be raised to the dot-dash position in Figure 19, by reversing the direction of cranking. In the latter event, the carriage 81 moves to the left, causing the boom 46 to pivotally move in a counter-clockwise direction.

It is thus apparent that by the structure above described, universal operation is obtainable, with feeding or discharging from either end, the apparatus being readily adjustable for inclination and height of the bed by simple operations. Since each section can be independently regulated to effect different inclinations, the device can operate within confined spaces that will not accommodate straight bed boosters. And regardless of the selected positions of the two opposite bed sections, the single belt is at all times maintained in proper operative tension by a simple and inexpensive mechanism.

In the above description, the invention has been disclosed merely by way of example and in preferred manner; but obviously many variations and modifications may be made therein which will still be comprised within its spirit. It is to be understood, therefore, that the invention is not limited to any specific form or manner of practicing same, except insofar as such limitations are specified in the appended claims.

I claim:

1. In an adjustable conveyor unit, a split belt bed comprising two adjacent pivotally mounted sections, an endless conveyor belt movably mounted on said bed, a drive roller below the bed and intermediate the ends thereof, the bed sections being split in the region above said drive roller, idler rollers in fixed position above said drive roller, the belt extending longitudinally over both of said sections and in underlying supporting engagement with said drive roller, the portion of the belt above the said bed being the carrying portion and the portion below the bed being the return portion, the said idler rollers and drive roller being in engagement with the said return portion of the belt, the carrying portion of the belt extending uninterruptedly over both sections, both of said sections being movable to different relative angular positions, whereby the level of the portion of the belt underlying the roller will be correspondingly varied, the belt being maintained in tension by the gravitational action of the roller upon the underlying portion of the belt.

2. In an adjustable conveyor unit, a split belt bed comprising two adjacent pivotally mounted sections, a central roller rotatably supported therebetween, a plurality of rollers in spaced relation along both of said sections, an endless conveyor belt movably mounted over said rollers, whereby the portion of the belt above said bed is the carrying portion and the portion below the bed is the return portion, a drive roller below the bed the bed sections being split in the region above said drive roller, and idler rollers in fixed position above said drive roller, said idler rollers being in engagement with said return portion of the belt, the carrying portion of the belt extending longitudinally and uninterruptedly over both of said sections, the return portion of the belt having a loop in underlying supporting engagement with said drive roller, both of said bed sections being movable to different relative angular positions, whereby the level of the portion of the belt loop underlying the roller will be correspondingly varied, the belt being maintained in tension by the gravitational action of the roller upon the belt loop.

3. In an adjustable conveyor unit, a split belt bed comprising two adjacent pivotally mounted sections an endless conveyor belt movably mounte on said bed, a drive roller below the bed, the bed sections being split in the region above said drive roller, idler rollers in fixed position above said drive roller, bearing means rotatably supporting the drive roller, a movably mounted platform attached to the bearing means, the belt extending longitudinally over both of said sections and in underlying supporting engagement with said drive roller, the portion of the belt above the said bed being the carrying portion and the portion below the bed being the return portion, the said idler rollers and drive roller being in engagement with the said return portion of the belt, the carrying portion of the belt extending uninterruptedly over both sections, both of said bed sections being movable to different relative angular positions, whereby the level of the portion of the belt underlying the roller will be correspondingly varied, the belt being maintained in tension by the gravitational action of the roller and the platform upon the underlying portion of the belt.

4. In an adjustable conveyor unit, the combination according to claim 3, the said platform being pivotally mounted.

5. In an adjustable conveyor unit, the combination according to claim 3, the said platform being pivotally mounted, further provided with a motor mounted on the platform and operatively connected to the roller, whereby the weight of the motor is transmitted through the platform to the roller exerting a gravitational tension-inducing action on the belt.

6. In an adjustable conveyor unit, the combination according to claim 3, the said platform being pivotally mounted, further provided with stop means for holding the platform against upward pivotal movement.

7. In an adjustable conveyor unit, a split belt bed comprising two adjacent pivotally mounted sections, an endless conveyor belt movably mounted on said bed, a drive roller below the bed, the bed sections being split in the region above said drive roller, idler rollers in fixed position above said drive roller, bearing means rotatably supporting the drive roller, a motor operatively connected to the roller, a housing for the motor and roller, a platform attached to the bearing means and pivotally mounted on the housing, the motor being mounted on the platform, a stop bolt pivotally secured to the platform and in adjustable releasable engagement with a portion of the housing therebelow for holding the platform against upward pivotal movement, the belt extending longitudinally over both of said sections and in underlying supporting engagement with said drive roller, the portion of the belt above the said bed being the carrying portion and the portion below the bed being the bed being the return portion, the said idler rollers and drive roller being in engagement with the said return portion of the belt, the carrying portion of the belt extending uninterruptedly over both sections, both of said bed sections being movable to different relative angular positions, whereby the level of the portion of the belt underlying the roller will be correspondingly varied, the belt being maintained in tension by the gravitational action of the roller upon the underlying portion of the belt.

8. In an adjustable conveyor unit, the combination according to claim 7, said housing being in underlying supporting engagement with the said belt bed.

9. In an adjustable conveyor unit, a split belt bed comprising two adjacent pivotally mounted sections, a central roller rotatably supported therebetween, a plurality of rollers in spaced relation along both of said sections, an endless conveyor belt movably mounted over said rollers, a drive roller below the bed, the bed sections being split in the region above said drive roller, idler rollers in fixed position above said drive roller, the portion of the belt above the said bed being the carrying portion and the portion below the bed being the return portion, said idler rollers being in engagement with said return portion of the belt, bearing means rotatably supporting the drive roller, a motor operatively connected to the roller, a housing for the motor and roller, a platform attached to the bearing means and pivotally mounted on the housing, the motor being mounted on the platform, the upper portion of the belt extending longitudinally and uninterruptedly over both of said sections, the lower portion of the belt having a loop in underlying supporting engagement with said drive roller, both of said bed sections being movable to different relative angular positions, whereby the level of the portion of the belt loop underlying the roller will be correspondingly varied, the belt being maintained in tension by the gravitational action of the roller, platform and motor upon the belt loop, and pillow block means supported by the housing and rotatably supporting said central roller between the said two belt bed sections.

10. In an adjustable conveyor unit, the combination according to claim 9, said central roller having a shaft in operative rotatable engagement with the said pillow block means, said bed sections having adjacent overlapping hinge plates rotatably mounted over said shaft.

11. In an adjustable conveyor unit, the combination according to claim 9, further provided with a plurality of booms pivotally supported by the housing and in supporting engagement with the said two belt beds.

12. In an adjustable conveyor unit, the combination according to claim 9, further provided with a plurality of booms pivotally supported by the housing and in supporting engagement with the said two belt beds, a rollably mounted base, and elevating means supported by the base and in underlying supporting engagement with the housing, whereby the level of the housing and the belt bed may be varied.

13. In an adjustable conveyor unit, a split belt bed comprising two adjacent pivotally mounted sections, an endless conveyor belt movably mounted on said bed, a drive roller below the bed, the bed sections being split in the region above said drive roller, idler rollers in fixed position above said drive roller, the belt extending longitudinally over both of said sections and in underlying supporting engagement with said drive roller, the portion of the belt above the said bed being the carrying portion and the portion below the bed being the return portion, the said idler rollers and drive roller being in engagement with the said return portion of the belt, the carrying portion of the belt extending uninterruptedly over both sections, and means to move said bed sections to different relative angular positions, whereby the level of the portion of the belt underlying the roller will be correspondingly varied, the belt being maintained in tension by the gravitational action of the roller upon the underlying portion of the belt, said means comprising a central support for the belt bed, oppositely disposed booms with their lower portions pivotally mounted on said support and their upper portions in supporting engagement with said bed sections, said booms being movable to different angular positions, whereby the said two belt bed sections will be correspondingly moved to different operative positions.

14. In an adjustable conveyor unit, the combination according to claim 13, each of said belt bed sections being provided with a carriage slidably mounted thereon for longitudinal movement therealong, transverse shafting extending within and supported by said carriage, the booms operatively associated with each section being pivotally mounted over their section's said shafting, and actuating means for slidably moving each carriage along its bed section, whereby the angular disposition of the booms and the sections supported thereby will be correspondingly varied.

15. In an adjustable conveyor unit, a split belt bed comprising two adjacent pivotally mounted sections, an endless conveyor belt movably mounted on said bed, a drive roller below the bed, the belt extending longitudinally over both of said sections and in underlying supporting engagement with said drive roller, and means to move said bed sections to different relative angular positions, whereby the level of the portion of the belt underlying the roller will be correspondingly varied, the belt being maintained in tension by the gravitational action of the roller upon the underlying portion of the belt, said means comprising a central support for the belt bed, oppositely disposed booms with their lower portions pivotally mounted on said support and their upper portions in supporting engagement with said bed sections, said booms being movable to different angular positions, whereby the said two belt bed sections will be correspondingly moved to different operative positions, each of said belt bed sections being provided with a carriage slidably mounted thereon for longitudinal movement therealong, transverse shafting extending within and supported by said carriage, the booms operatively associated with each section being pivotally mounted over their section's said shafting, and actuating means for slidably moving each carriage along its bed section, whereby the angular disposition of the booms and the sections supported thereby will be correspondingly varied, said actuating means comprising a threaded carrier rod extending longitudinally through the carriage, a gear mounted over said rod and in threaded engagement therewith, whereby a rotation of the gear will cause it to move longitudinally relative to the rod, said gear being connected with the carriage, whereby the carriage will move longitudinally with the longitudinal movements of the gear, and means for rotating said gear.

16. In an adjustable conveyor unit, the combination according to claim 15, the said means for rotating the gear comprising a second gear in engagement with the first-mentioned gear, and crank means rotatably mounted on the booms and operatively connected to said second gear.

JOHN W. STILES.

REFERENCES CITED

The following references are of record in the file of this patent:

UNITED STATES PATENTS

| Number | Name | Date |
|---|---|---|
| 552,716 | Matthiessen | Jan. 7, 1896 |
| 1,417,306 | Dremel | May 23, 1922 |
| 1,694,868 | Sawyer | Dec. 11, 1928 |
| 1,943,869 | Kendall | Jan. 16, 1934 |
| 2,202,882 | Wylie | June 4, 1940 |
| 2,501,448 | Lockwood | Mar. 21, 1950 |
| 2,516,192 | Ensinger | July 25, 1950 |

FOREIGN PATENTS

| Number | Country | Date |
|---|---|---|
| 822,644 | France | Jan. 5, 1938 |